US010902191B1

(12) United States Patent
Feigenblat et al.

(10) Patent No.: US 10,902,191 B1
(45) Date of Patent: Jan. 26, 2021

(54) NATURAL LANGUAGE PROCESSING TECHNIQUES FOR GENERATING A DOCUMENT SUMMARY

(71) Applicant: International Business Machines Corporation, Armonk, NY (US)

(72) Inventors: Guy Feigenblat, Givataym (IL); David Konopnicki, Haifa (IL); Edward Moroshko, Haifa (IL); Haggai Roitman, Yoknea'm Elit (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/531,151

(22) Filed: Aug. 5, 2019

(51) Int. Cl.
| | |
|---|---|
| *G06F 17/00* | (2019.01) |
| *G06F 40/166* | (2020.01) |
| *G06F 16/93* | (2019.01) |
| *G06N 3/04* | (2006.01) |
| *G06N 3/08* | (2006.01) |
| *G06F 40/20* | (2020.01) |

(52) U.S. Cl.
CPC ............ *G06F 40/166* (2020.01); *G06F 16/93* (2019.01); *G06F 40/20* (2020.01); *G06N 3/04* (2013.01); *G06N 3/08* (2013.01)

(58) Field of Classification Search
CPC ........ G06F 40/166; G06F 16/93; G06F 40/20; G06N 3/08; G06N 3/04
See application file for complete search history.

(56) References Cited

U.S. PATENT DOCUMENTS

| | | | | |
|---|---|---|---|---|
| 8,495,042 B2* | 7/2013 | Symington | ............. | G06F 16/34 |
| | | | | 707/702 |
| 9,483,730 B2* | 11/2016 | Di Fabbrizio | ..... | G06Q 30/0631 |
| 10,303,771 B1* | 5/2019 | Jezewski | ............... | G06F 40/284 |
| 2005/0108001 A1* | 5/2005 | Aarskog | ............... | G06F 40/289 |
| | | | | 704/10 |
| 2006/0036596 A1* | 2/2006 | Zhang | .................. | G06F 16/345 |

(Continued)

FOREIGN PATENT DOCUMENTS

| | | | |
|---|---|---|---|
| CN | 108090049 A | * | 5/2018 |
| WO | 2018233647 A1 | | 12/2018 |

OTHER PUBLICATIONS

Hsu, Wan-Ting et al., "A Unified Model for Extractive and Abstractive Summarization using Inconsistency Loss", Cornell University Library, arXiv:1805.06266, Jul. 5, 2018, pp. 132-141.

*Primary Examiner* — Laurie A Ries
(74) *Attorney, Agent, or Firm* — Barry D. Blount (57) ABSTRACT

A system for generating a summary of a text document is disclosed. In some examples, the system includes a processor configured to generate an initial summary of an original document. The initial summary includes a selection of extracted sentences copied from the original document. For each extracted sentence of the initial summary, the processor processes the extracted sentence to generate an abstracted sentence, and generates vector representations of the extracted sentence, the abstracted sentence, the original document, and the current summary. The vector representations are then input to a decision network to compute an editing decision. The editing decision is selected from a group of possible decisions that includes a decision to add the extracted sentence and a decision to add the abstracted sentence. The processor also updates the current summary based on the editing decision.

20 Claims, 6 Drawing Sheets

(56) References Cited

U.S. PATENT DOCUMENTS

| | | | |
|---|---|---|---|
| 2017/0132313 A1* | 5/2017 | Kukla | G06F 16/338 |
| 2017/0147544 A1* | 5/2017 | Modani | G06N 5/003 |
| 2018/0018392 A1* | 1/2018 | Simske | G06F 16/353 |
| 2018/0204111 A1* | 7/2018 | Zadeh | G06K 9/00281 |
| 2019/0349321 A1* | 11/2019 | Cai | G06N 3/006 |
| 2019/0370338 A1* | 12/2019 | Kong | G06N 3/0445 |
| 2020/0004823 A1* | 1/2020 | Chatterjee | G06N 3/08 |
| 2020/0042583 A1* | 2/2020 | Wang | G06F 40/253 |
| 2020/0042645 A1* | 2/2020 | Douthit | G06F 16/353 |
| 2020/0134091 A1* | 4/2020 | Feigenblat | G06F 16/345 |
| 2020/0175119 A1* | 6/2020 | Chung | G06F 40/30 |

* cited by examiner

NATURAL LANGUAGE PROCESSING TECHNIQUES FOR GENERATING A DOCUMENT SUMMARY

BACKGROUND

The present disclosure relates to natural language processing techniques, including a system for automatically generating a summary from an original text document.

SUMMARY

According to an embodiment described herein, a system for generating a summary of a text document includes a processor configured to generate an initial summary of an original document. The initial summary includes a selection of extracted sentences copied from the original document. For each extracted sentence of the initial summary, the processor processes the extracted sentence to generate an abstracted sentence, and generates vector representations of the extracted sentence, the abstracted sentence, the original document, and the current summary. The vector representations are then input to a decision network to compute an editing decision. The editing decision is selected from a group of possible decisions that includes a decision to add the extracted sentence and a decision to add the abstracted sentence. The processor also updates the current summary based on the editing decision.

In some embodiments, a method of generating a summary of a text document includes generating an initial summary of an original document, wherein the initial summary includes a selection of extracted sentences copied from the original document. The method also includes performing a set of actions for each extracted sentence of the initial summary. The actions include processing the extracted sentence to generate an abstracted sentence and generating vector representations of the extracted sentence, the abstracted sentence, the original document, and the current summary. The actions also include inputting the vector representations to a decision network to compute an editing decision, wherein the editing decision is selected from a group of possible decisions that includes a decision to add the extracted sentence and a decision to add the abstracted sentence. The actions also include updating the current summary based on the editing decision.

In yet another embodiment, a computer program product for generating a summary of a text document can include a computer readable storage medium having program instructions embodied therewith, wherein the computer readable storage medium is not a transitory signal per se. The program instructions can be executable by a processor to cause the processor to generate an initial summary of an original document, wherein the initial summary includes a selection of extracted sentences copied from the original document. For each extracted sentence of the initial summary, the program instructions can be executable by the processor to process the extracted sentence to generate an abstracted sentence, and generate vector representations of the extracted sentence, the abstracted sentence, the original document, and the current summary. The program instructions can be executable by the processor to input the vector representations to a decision network to compute an editing decision, wherein the editing decision is selected from a group of possible decisions that includes a decision to add the extracted sentence and a decision to add the abstracted sentence. The program instructions can be executable by the processor to update the current summary based on the editing decision.

DETAILED DESCRIPTION

The present disclosure describes natural language processing techniques for generating textual summaries of original text documents. The original documents may be aby suitable type of document written by a human author, including news articles, scientific papers, essays, business documents, and others. A system in accordance with embodiments processes the original document automatically (i.e., without human involvement) to condense the original document into a shorter version (i.e., a summary). The original document is condensed while trying to preserve the main essence of the original text and keeping the generated summary as readable as possible.

The summarization process described herein can generate a summary that is a combination of extracted and abstracted sentences. Extracted sentences are portions of the original text document that are copied directly from the original document and imported into the summary unchanged. Building a summary from only extracted sentences keeps the extracted fragments untouched, allowing the preservation of important features, such as key phrases, facts, opinions, and the like. However, a summary with only extracted sentences tend to be less fluent, coherent, and readable and may sometimes include superfluous text.

To improve the quality of the summary, it may be useful in some cases to replace an extracted sentence with an abstracted sentence. An abstracted sentence may be generated by applying natural language paraphrasing and/or compression on a given text. For example, an abstracted sentence may be generated using an encoder-decoder (sequence-to-sequence) technique, with the original text sequence being encoded while the abstracted sentence is the decoded sequence. In some cases, abstracted sentences may provide better readability. However, the accuracy of a summary with only abstracted sentences may tend to decline over large textual inputs, and sometimes results in higher redundancy.

To improve the overall readability of the summary while maintaining accuracy and reducing redundancy, the system describe herein can generate a summary that is a combination of extracted and abstracted sentences. As describe more fully below, the system may include a trained artificial neural network that receives a set of inputs related to an initial summary. The initial summary includes a set of extracted sentences that have been extracted from an original document. For each extracted sentence, the network generates a decision about what to add to the summary. For example, the decision can be a decision to add the extracted sentence to the summary, or to add an abstracted version of the extracted sentence to the summary. In some embodiments, the network can also generate a decision to discard the sentence.

Figure 1:
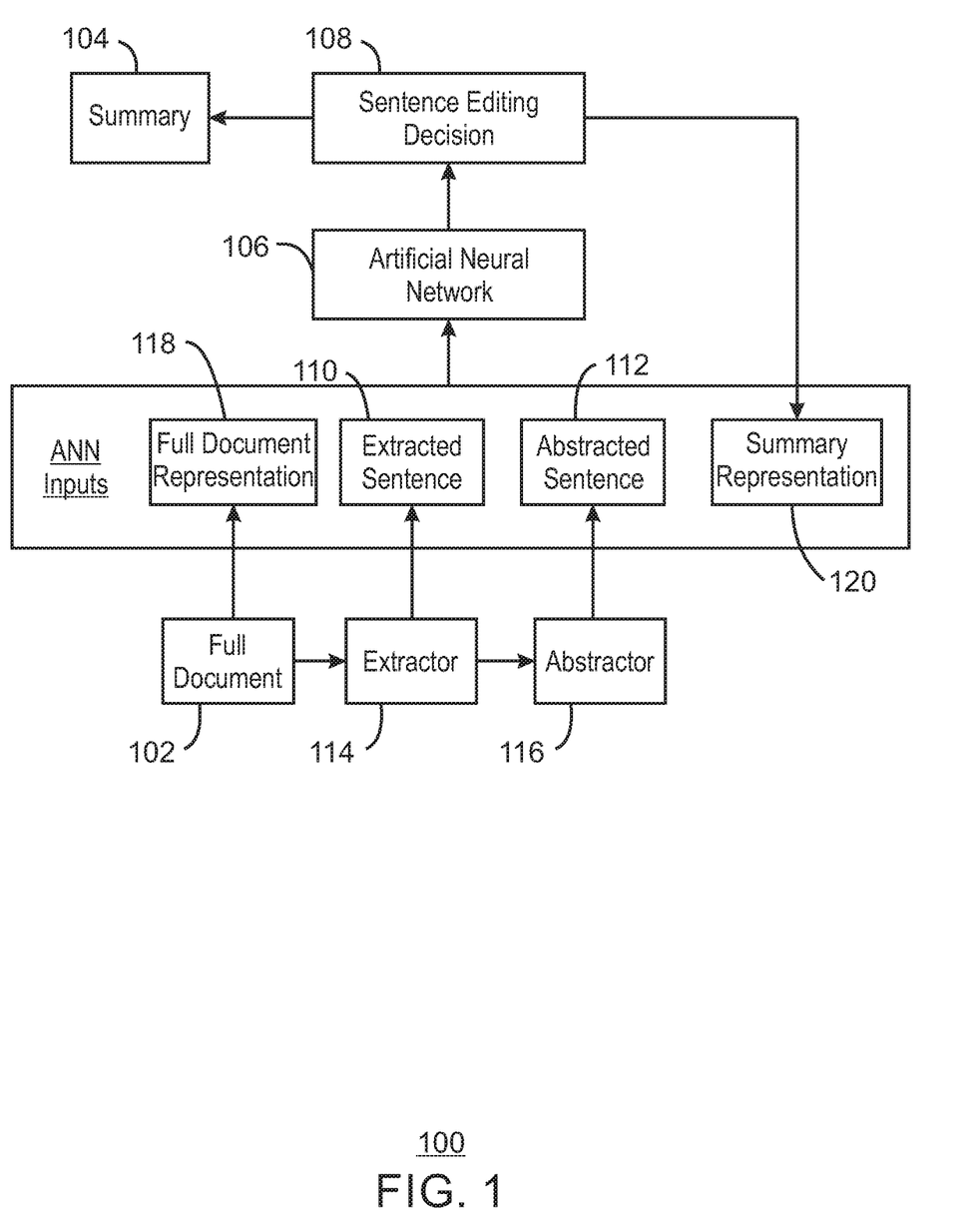
FIG. 1 is a block diagram of a system for generating document summaries, according to an embodiment described herein.

FIG. 1 is a block diagram of a system for generating document summaries, according to an embodiment described herein. The system 100 may be implemented by hardware or a combination of hardware and software. For example, the system 100 may be implemented by the computing device 300 of FIG. 3. The input to the system 100 is a full document 102 and the output of the system is a summary 104 of the full document 102. The system 100 is configured to perform an iterative process wherein, for selected sentences of the full document 102, an editing decision is made regarding whether to add the extracted sentence to the summary, add an abstracted version of the extracted sentence to the summary, or discard the extracted sentence.

The system 100 includes a trained artificial neural network (ANN) 106, which is configured to output the editing decision 108 with regard to each sentence input to the system 100. In some embodiments, the ANN 106 is a two-layer, fully-connected neural network. Additional details of an example ANN 106 and training process are described in relation to FIG. 2.

The data input to the ANN 106 for each editing decision includes a representation of the extracted sentence, referred to herein as the extracted sentence vector 110, and a representation of the corresponding abstracted sentence, referred to herein as the abstracted sentence vector 112. To generate the input to the system 100, the full document 102 is processed by an extractor 114 that generates an initial summary by determining which sentences to include in the initial summary and which sentences to exclude. The initial summary, S, is a set of extracted sentences that have been identified by the extractor 114 for inclusion in the initial summary.

Each extracted sentence is processed by an abstractor 116 that generates the corresponding abstracted representation of the extracted sentence. The extracted sentences and abstracted sentences are further processed to generate vector representations of each sentence, i.e., the extracted sentence vector 110 and the abstracted sentence vector 112. Each vector is a vector set of n real numbers. To generate the vector representation of a sentence, the sentence is processed to extract the sentence's tokens (e.g., words or phrases). Each token identified in the sentence is mapped to a corresponding position in the vector. For example, the corresponding position in the vector can be incremented each time a particular word or phrase mapped to that position occurs in the sentence. Next, embedded word vectors are generated by mapping each word to m-dimensional pre-trained word vectors. The embedded word vectors may then be input to a convolutional sentence encoder to generate the vector representation of the sentence.

The input to the ANN 106 also includes two auxiliary representations, a full document representation 118 and a summary representation 120. The full document representation 118 provides a global context for making editing decisions, and will remain unchanged throughout the process of generating the summary for the full document. The summary representation 120 is a representation of the summary 104 that has been generated after the previous editing decision. Both the full document representation 118 and the summary representation 120 are vector sets of the same dimension as the extracted sentence vector 110 and the abstracted sentence vector 112 (i.e., n real numbers). The generation of both the full document representation 118 and the summary representation 120 is described further in relation to FIG. 2.

The four input vectors are input to the ANN 106 and the output of the ANN 106 is an editing decision 108 regarding the input sentence. If the editing decision 108 is a decision to add the extracted sentence to the summary 104, the extracted sentence is added as the next sentence in the summary 104. If the editing decision is a decision to add the abstracted sentence to the summary, the abstracted sentence is added as the next sentence in the summary 104 instead of the extracted sentence. If the editing decision is a decision to discard the sentence, no sentence is added and the summary remains unchanged from the previous iteration.

After the editing decision is determined, the summary representation 120 is updated and the next iteration of the process begins with the next sentence of the initial summary generated by the extractor 114. The process continues until an editing decision has been made with regard to each sentence of the initial summary. The resulting summary 104 can then be stored to a storage memory and associated with the original document.

It will be appreciated that the above description is a summary of the techniques described herein and then many additional sub-processes may be performed to generate the summary. A more detailed description of an example summary generation system is described in relation to FIG. 2.

Figure 2:
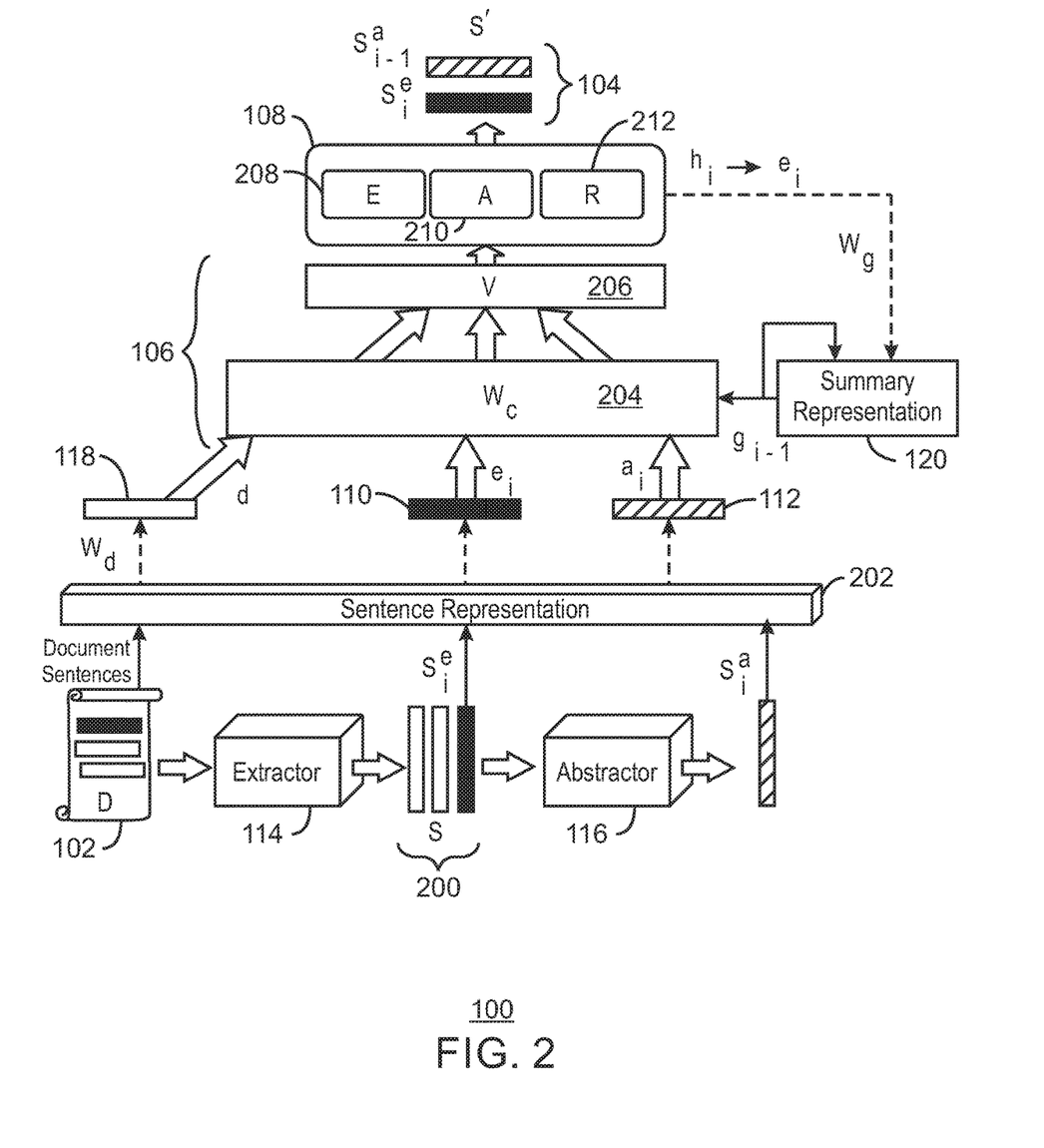
FIG. 2 is a block diagram of an example system for generating document summaries, according to an embodiment described herein.

FIG. 2 is a block diagram of an example system for generating document summaries, according to an embodiment described herein. The system shown in FIG. 2 is a more detailed example of the system 100 described in relation to FIG. 1. The editorial process described herein is performed over an initial summary (S) 200, whose sentences were selected by the extractor 114 from a full document (D) 102. The process performed by the system 100 edits the summary 200 to generate the higher quality summary 104 (denoted S'). The editorial process may be implemented by iterating over sentences of the initial summary 200 according to the selection order of the extractor 114.

As used herein $s_i^e$ and $s_i^a$ refer to the original (i.e., extracted) and paraphrased (i.e., abstracted) versions of a given sentence $s_i \in S$, respectively. Additionally, $e_i$ and $a_i$ refer to the corresponding mathematical representations of $s_i^e$ and $s_i^a$, such that $e_i$ represents the extracted sentence vector 110 and $a_i$ represents the abstracted sentence vector 112. Both $e_i$ and $a_i$ are vector sets of n real numbers ($e_i \in \mathbb{R}^n$ and $a_i \in \mathbb{R}^n$). Both $e_i$ and $a_i$ may be generated by a sentence representation engine, which parses each sentence and maps each word or phrase (i.e., token) to a corresponding position of the vector, then maps each word to m-dimensional pre-trained word vectors, and inputs the resulting embedded word vectors into a convolutional sentence encoder, as explained above.

The extractor 114 may be any suitable type of extractor. In some embodiments, the extractor consists of two main subcomponents, an encoder and a sentence selector. The encoder can encode each sentence into its corresponding vector representation, $e_i$, using a hierarchical representation. For example, the hierarchical representation may be a combination of a temporal convolutional model followed by a bidirectional Long Short-Term Memory (biLSTM) encoder. The sentence selector can use an artificial neural network, such as a Multilayer Perceptron (MLP) or Pointer Network, to identify which sentences to add to the initial summary. The sentence selector may calculate a selection likelihood for each sentence, P($s_i$), according to a selection policy P(•), and select the sentences for inclusion within the initial summary 200 based on the likelihood.

The abstractor 116 may be any suitable type of encoder-decoder, such as any type of sequence-to-sequence (seq2seq) model. In some embodiments, the abstractor 116 may be an encoder-aligner-decoder with a copy mechanism. The abstractor 116 operates by encoding the sentence into a vector representation and then decoding the resulting vector back into a textual representation of the sentence, which is the paraphrased or abstracted sentence $s_i^a$.

The abstractor 116 may be applied to each extracted sentence individually to generate the corresponding abstracted sentence. In some embodiments, instead of applying the abstractor 116 on single extracted sentences, the abstractor 116 may be applied to a group of three consecutive sentences ($s_-^e$, $s_i^e$, $s_+^e$), to generate the abstracted sentence, $s_i^a$, where $s_-^e$ and $s_+^e$ denote the sentence that precedes and succeeds $s_i^e$ in D, respectively. This allows the generation of an abstractive version of $s_i^e$ (i.e., $s_i^a$) that benefits from a wider local context. In addition, the word attention applied by the abstractor 116 may be enhanced using the extractor's decisions, which are given by extractor's sentence selection policy P(•). For example, $C_{w_j}$ represents the original attention value of word, $w_j$. For each given word $w_j \in s$, where $s \in \{s_-^e, s_i^e, s_+^e\}$, the attention applied to the word may be biased according to the selection likelihood calculated for the sentence by the extractor 114. This biasing may be implemented according to the following formula, where Z is a normalization term:

$$\frac{C_{w_j}P(s)}{Z}; \text{where}$$

$$Z = \sum s' \in \{s_-^e, s_i^e, s_+^e\} \sum w_j \in s' C_{w_j} \cdot P(s')$$

In order to have a proper comparison between the extracted sentence vectors, $e_i$, and the abstracted sentence vectors, $a_i$, both sentence versions are encoded in a similar manner. To achieve a proper encoding of the abstracted sentence, $s_i^a$, into the vector representation, $a_i$, the abstracted sentence, $s_i^a$, is first inserted into the whole document, D, in place of its corresponding extracted sentence, $s_i^e$. In this way, $s_i^a$ is treated as if it was an ordinary sentence within the whole document, while the rest of the document remains untouched. The vector representation of the abstracted sentence is then encoded using the extractor's encoder in a similar way in which sentence $s_i^e$ was encoded. This results in a representation, $a_i$, that provides a comparable alternative to, $e_i$, whose encoding is likely to be effected by similar contextual grounds.

Another input to the ANN 106 is the full document representation 118 (denoted d). The full document representation 118 is a vector set of n real numbers (d∈ℝ $^n$). The full document representation 118 may be computed by first calculating the mean, $\bar{e}$, of all of the extracted sentence vectors in the full document according to the following formula, wherein N is the number of sentences in the full document:

$$\bar{e} = \frac{1}{N}\sum_{i=1}^{N} e_i$$

The full document representation, d, may then be computed using the following formula:

$$d = \tanh(W_d \bar{e} + b_d)$$

In the above formula, $W_d$ is an n by n matrix of real numbers ($W_d \in \mathbb{R}^{n \times n}$), and $b_d$ is a vector set of n real numbers ($b_d \in \mathbb{R}^n$), which are used as a biasing factor. $W_d$ and $b_d$ are learnable parameters that can be identified through a training process.

The next input to the ANN 106 is the summary representation 120 (denoted $g_{i-1}$). The summary representation 120 is a vector set representing the summary, S', that has been generated by the editor so far. The summary representation 120 is a vector set of n real numbers ($g_{i-1} \in \mathbb{R}^n$), which is generated based on the editing decisions. In the first iteration, $g_{i-1}$ may be set to vector set of all zeros ($\vec{g_0} = \vec{0}$). After each iteration, the summary representation is recalculated based on the editing decision. The summary representation, $g_i$, may be updated according to the following formula:

$$g_i = g_{i-1} + \tanh(W_g h_i)$$

In the above formula, $h_i$ is the vector representation of the selected sentence or a vector set of n zeros if the sentence was discarded (i.e., $h_i \in \{e_i, a_i, \vec{0}\}$, depending on the editing decision that was made in the iteration that was just completed).

In the example system of FIG. 2, the ANN 106 includes two fully-connected layers, a first layer 204 denoted $W_c$, and a second layer 206 denoted V. In this example, $W_c$ is a matrix of real numbers of the dimensions m by 4n ($W_c \in \mathbb{R}^{m \times 4n}$), V is a matrix of real numbers of the dimensions 3 by m (V∈ ℝ $^{3 \times m}$), $b_c$ is a matrix of m real numbers ($b_c \in \mathbb{R}^m$) representing bias values applied to the first layer, and b is a vector set of 3 real numbers (b∈ℝ $^3$) representing bias values applied to the second layer. In some embodiments, m may be equal to 512 and n may be equal to 512. However, it will be appreciated that other dimensions may be used.

Given the four representations d, $e_i$, $a_i$, and $g_{i-1}$ as an input, the editor's decision for each sentence $s_i \in S$ is implemented using the ANN 106, as follows:

$$\text{softmax}(V \tanh(W_c[e_i \cdot a_i \cdot g_{i-1} \cdot d] + b_c) + b)$$

In the above equation [·] denotes a vectors concatenation, and the values for $W_c$, V, $b_c$, and b are learnable parameters that can be determined using a training process as described below. In each step, i, the ANN 106 computes three outputs, each one associated with a different editing decision. The first output 208 (denoted E) is a likelihood value for the decision to add the extracted sentence to the summary 104, the second output 210 (denoted A) is a likelihood value for the decision to add the abstracted sentence to the summary 104, and the third output 212 (denoted R) is a likelihood value for the decision to reject the sentence. The system 100 then chooses the editing decision (denoted $\pi_i$) based on which output has the highest likelihood value (denoted $p(\pi_i)$). In other words, the output with the highest probability value is chosen as the editing decision for the current iteration ($\pi_i \in \{E, A, R\}$ depending on which of E, A, and R is higher). The system 100 then appends the corresponding sentence version (i.e., either $s_i^e$ or $s_i^a$) to the summary S', or if the editing decision is R the sentence $s_i$ is discarded.

The system 100 described above is able to capture various complex interactions between the different inputs. For example, the system 100 may learn that by choosing any one of the two candidate sentence versions, based on the current local context, the generated summary would be more fluent.

As another example, the system 100 may learn that given the global context, one of the sentence versions may better fit in terms of the amount of salient information it may contain. Finally, based on the interaction between both sentence versions with either of the local and global contexts (and among the last two), the system 100 may learn that both sentence versions may only add superfluous or redundant information to the summary, and therefore, decide to reject both.

Network Training

The training of the ANN 106 may be performed using a set of training data that includes a group of documents and associated summaries. For the training data, the documents and their corresponding summaries have been written by human authors. The training data may be obtained by any suitable database of documents.

The weights and biases of the ANN 106, i.e., the learnable parameters $W_c$, $W_d$, $W_g$, V, $b_c$, $b_d$, and b, are adjusted in an iterative process to obtain a solution that minimizes a loss function. During each iteration of the training process, the learnable parameters may be adjusted using a teacher forcing method, in which the ground truth label from the training data is used as input to the network instead using of the output of the network as the input for the next iteration. After adjusting the learnable parameters of the ANN, a predicted summary is generated using one of the documents from the training data, and the loss function for the predicted summary is computed based on a comparison of the summary with the corresponding author-generated summary. After a suitable number of iterations or after the loss function is below a threshold, for example, the trained ANN 106 may be evaluated against additional documents and summaries of the training data and eventually stored for later use in generating document summaries as described above.

In some embodiments, the loss function is a "soft" version of a cross entropy loss function. The cross entropy loss function provides an indication of the loss of information resulting from the predicted summary as opposed to other possible summaries that could have been generated. To generate the loss function for a particular predicted summary, a soft label estimation is performed for the predicted summary. The soft label estimation may be performed by computing a quality score, r, for all of the possible summaries that could have been generated (r(S')). The quality score is used to evaluate the quality of any given summary, S'. Overall, for a given initial summary, S, with l sentences, there are $3^l$ possible summaries, S', and a quality score is generated for each one. The following table is an example of the quality scores computed for an initial summary with 3 sentences.

TABLE 1 quality scores

| Potential Summaries | Sentence 0 | Sentence 1 | Sentence 2 | Quality Score |
|---|---|---|---|---|
| 0 | 0 | 0 | 0 | $r_0$ |
| 1 | 0 | 0 | 1 | $r_1$ |
| 2 | 0 | 1 | 0 | $r_2$ |
| 3 | 0 | 1 | 1 | $r_3$ |
| 4 | 1 | 0 | 0 | $r_4$ |
| 5 | 1 | 0 | 1 | $r_5$ |
| 6 | 1 | 1 | 0 | $r_6$ |
| 7 | 1 | 1 | 1 | $r_7$ |

In the table, each row represents one of the possible summaries, S', for an initial summary with three sentences. Each potential summary (labeled 0-7) is represented as a sequence of hypothetical editing decisions $\pi_j \in \{E, A, R\}$. The middle three columns represent the hypothetical editing decisions for each of the sentences of the corresponding potential summary, wherein 0 indicates that the extracted sentence is included in the summary, and 1 indicates that the abstracted sentence is included in the summary. For the sake of simplicity, the summaries in which a sentence is discarded are not shown. However, it will be appreciated that the actual table would include 27 rows of potential summaries.

The right column shows the corresponding quality score computed for each potential summary. In some embodiments, the quality score may be a type of quality score known as a rouge score. The quality scores may be calculated by comparing the actual human-authored summary to each of the potential summaries. Any suitable technique may be used to generate the quality scores. The quality score reflects the degree to which the information content of the hypothetical summary matches the information content of the human-authored summary.

A soft label $y(\pi_i)$ is computed for each editing decision of the predicted summary using the quality scores. The soft label $y(\pi_i)$ may be referred to as the gain, which is the benefit gained if making the editing decision, $\pi_i$. In this example, the soft label, $y(\pi_i)$, is the average of all of the alternative quality scores that are included by the editing decision, $\pi_i$, divided by a normalization factor, which is the average of all of the quality scores. In other words, assuming that the editing decision for the first sentence is 0 (keep extracted), then the soft label for deciding on the first sentence would equal the sum of quality scores $r_0$, $r_1$, $r_2$, and $r_3$, divided by the normalization factor. If the editing decision for the first sentence is 1 (keep abstracted), then the soft label for this decision would equal the average of quality scores $r_4$, $r_5$, $r_6$, and $r_7$, divided by the normalization factor. The soft label computed for each sentence will be dependent on the decisions made for all preceding sentences. For example, assuming that the editing decision for the first sentence is 0, then the soft labels for deciding on the second sentence would be calculated by summing quality scores $r_0$ and $r_1$ for keep extracted or $r_2$ and $r_3$ for keep abstracted. The above process can be written as:

$$y(\pi_i) = \frac{\bar{r}(\pi_1^*, \ldots, \pi_{i-1}^*, \pi_i)}{\sum_{\pi_j \in \{E, A, R\}} \bar{r}(\pi_1^*, \ldots, \pi_{i-1}^*, \pi_j)}$$

In the above equation, $(\pi^* = \pi_1^*, \ldots, \pi_l^*)$ denotes the optimal decision sequence, i.e., the decision sequence that maximizes the quality score, r. For $i \in \{1, 2, \ldots, l\}$, $r(\pi_1^*, \ldots \pi_{i-1}^*, \pi_i)$ denotes the average quality score value obtained by decision sequences that start with the prefix $(\pi_1^*, \ldots, \pi_{i-1}^*, \pi_i)$. For i=1, $\bar{r}(\pi_1^*, \ldots, \pi_{i-1}^*, \pi_i) = \bar{r}(\pi_i)$.

Using the estimated soft labels computed for each editing decision of the predicted summary, the loss function for the predicted summary may be computed according to the following formula:

$$\mathcal{L}(\pi | S) = \frac{1}{l} \sum_{s_i \in S} \sum_{\pi_i \in \{E, A, R\}} y(\pi_i) \log p(\pi_i)$$

In the above equation, $\mathcal{L}(\pi | S)$ refers to the loss function for predicted summary, S', which is computed based on each of the editing decisions, $\pi$. According to the above formula, the soft label for each editing decision is multiplied by the log of the probability, p(•), which is the probability that the ANN 106 assigns to the decision. These values are then summed for each sentence of the initial summary and divided by the number of sentences in the initial summary.

Figure 3:
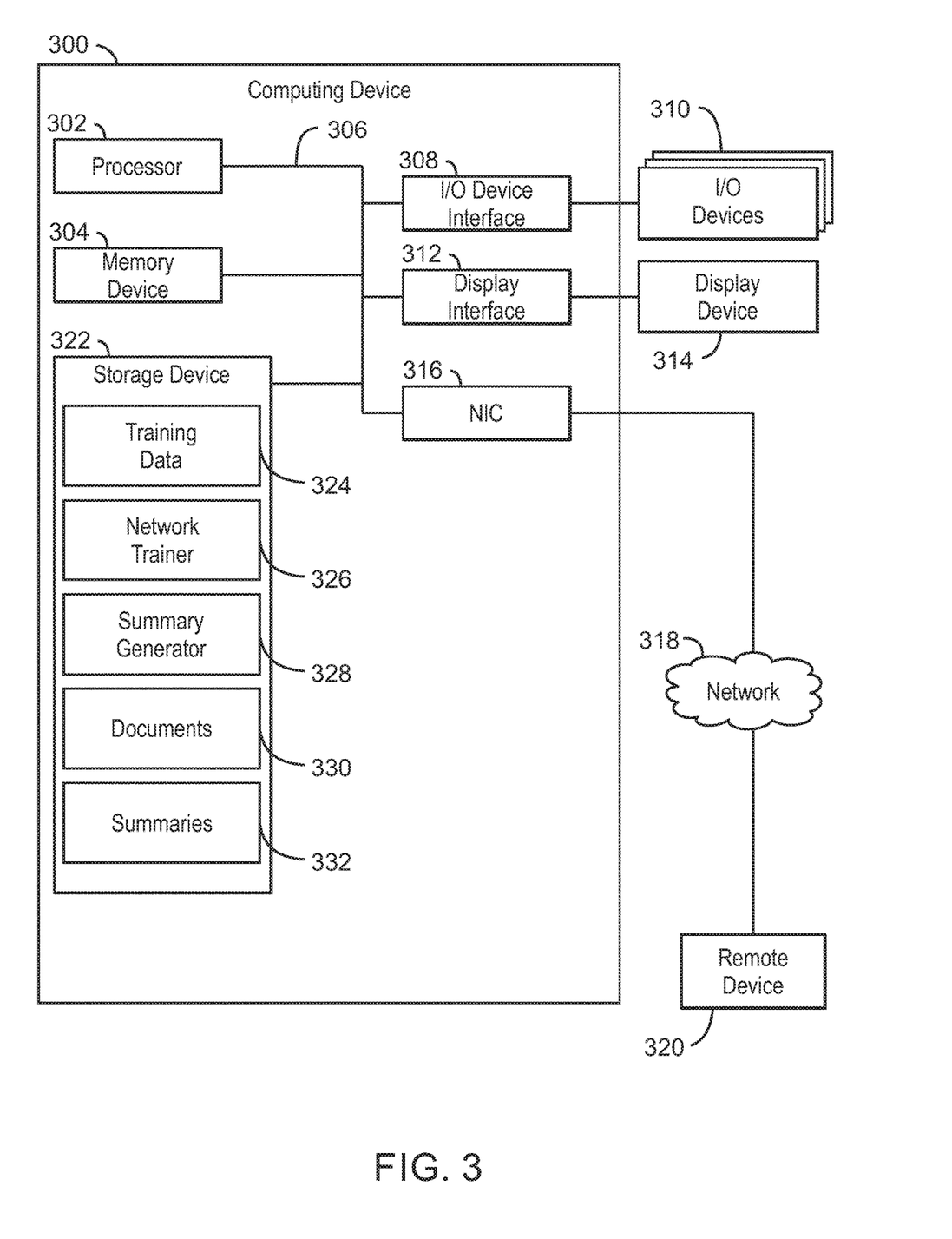
FIG. 3 is an example computing device configured to generate document summaries.

With reference now to FIG. 3, an example computing device is depicted that can generate document summaries. The computing device 300 may be for example, a server, desktop computer, laptop computer, tablet computer, or smartphone. In some examples, computing device 300 may be a cloud computing node. Computing device 300 may be described in the general context of computer system executable instructions, such as program modules, being executed by a computer system. Generally, program modules may include routines, programs, objects, components, logic, data structures, and so on that perform particular tasks or implement particular abstract data types. Computing device 300 may be practiced in distributed cloud computing environments where tasks are performed by remote processing devices that are linked through a communications network. In a distributed cloud computing environment, program modules may be located in both local and remote computer system storage media including memory storage devices.

The computing device 300 may include a processor 302 that is adapted to execute stored instructions, a memory device 304 to provide temporary memory space for operations of said instructions during operation. The processor can be a single-core processor, multi-core processor, computing cluster, or any number of other configurations. The memory 304 can include random access memory (RAM), read only memory, flash memory, or any other suitable memory systems.

The processor 302 may be connected through a system interconnect 306 (e.g., PCI®, PCI-Express®, etc.) to an input/output (I/O) device interface 308 adapted to connect the computing device 300 to one or more I/O devices 310. The I/O devices 310 may include, for example, a keyboard and a pointing device, wherein the pointing device may include a touchpad or a touchscreen, among others. The I/O devices 310 may be built-in components of the computing device 300, or may be devices that are externally connected to the computing device 300.

The processor 302 may also be linked through the system interconnect 306 to a display interface 312 adapted to connect the computing device 300 to a display device 314. The display device 314 may include a display screen that is a built-in component of the computing device 300. The display device 314 may also include a computer monitor, television, or projector, among others, that is externally connected to the computing device 300. In addition, a network interface controller (NIC) 316 may be adapted to connect the computing device 300 through the system interconnect 306 to the network 318. In some embodiments, the NIC 316 can transmit data using any suitable interface or protocol, such as the internet small computer system interface, among others. The network 318 may be a cellular network, a radio network, a wide area network (WAN), a local area network (LAN), or the Internet, among others. A remote device 320 may connect to the computing device 300 through the network 318.

In some examples, the processor 302 can be linked through the system interconnect 306 to the storage device 322, which can include training data 324 and a network trainer 326. The network trainer 326 is configured to generate the trained ANN 106 as describe above in relation to FIG. 2. The trained ANN 106 can be used in a summary generator 328 to generate document summaries as shown in FIGS. 1 and 2. The storage device 322 can also include a set of text documents 330. The summary generator 328 may receive a selection of one or more documents 330 from a user and automatically generate summaries 332 corresponding to each of the selected documents.

It is to be understood that the block diagram of FIG. 3 is not intended to indicate that the computing device 300 is to include all of the components shown in FIG. 3. Rather, the computing device 300 can include fewer or additional components not illustrated in FIG. 3 (e.g., additional memory components, embedded controllers, modules, additional network interfaces, etc.). Furthermore, any of the functionalities of the network trainer 326 and the summary generator 328 are partially, or entirely, implemented in hardware and/or in the processor 302. For example, the functionality may be implemented with an application specific integrated circuit, logic implemented in an embedded controller, or in logic implemented in the processor 302, among others. In some embodiments, the functionalities are implemented with logic, wherein the logic, as referred to herein, can include any suitable hardware (e.g., a processor, among others), software (e.g., an application, among others), firmware, or any suitable combination of hardware, software, and firmware.

Figure 4:
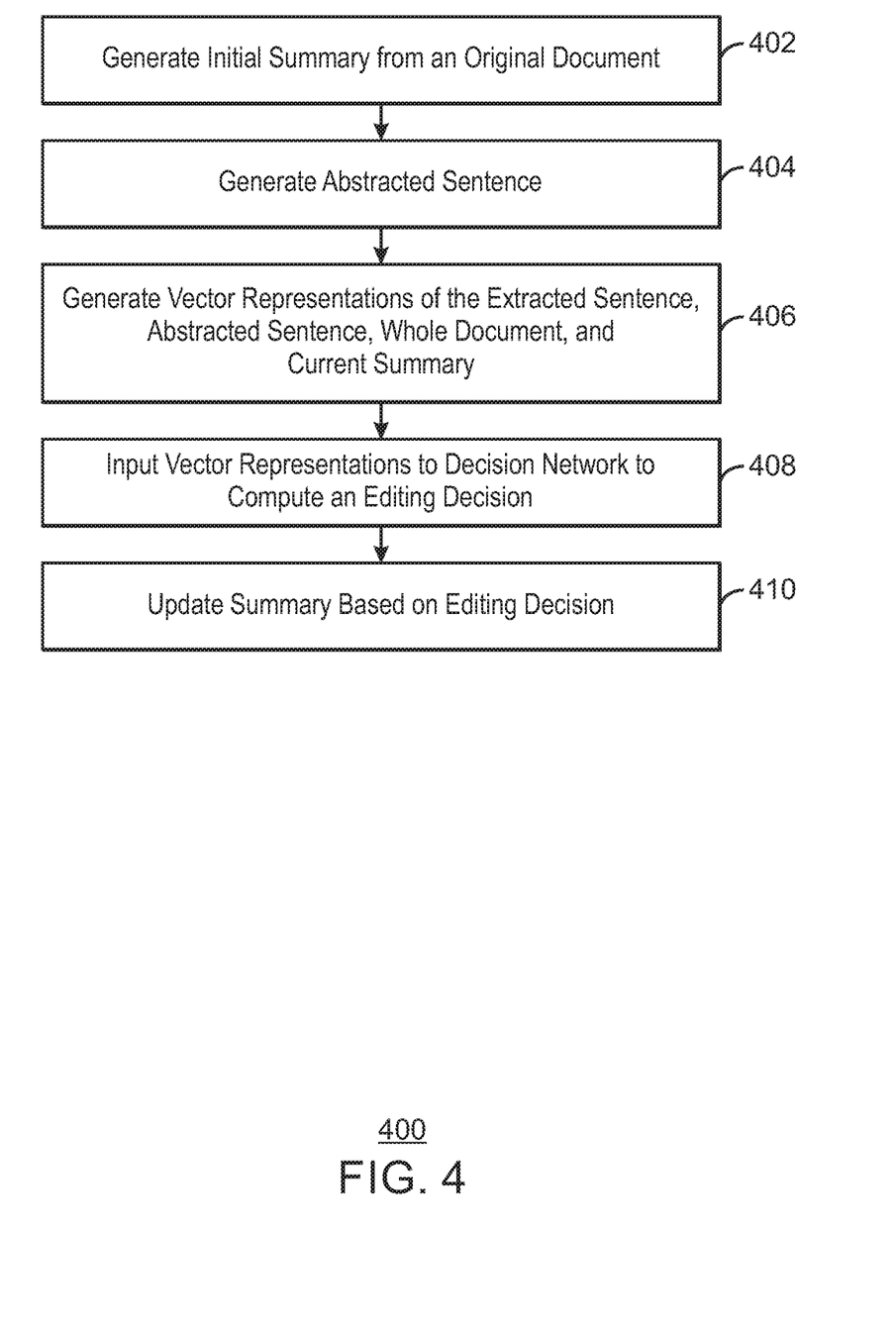
FIG. 4 is a process flow diagram summarizing an example method of automatically generating a document summary.

FIG. 4 is a process flow diagram summarizing an example method of automatically generating a document summary. The method 400 can be implemented with any suitable computing device, such as the computing device 300 of FIG. 3 implementing the system 100 describe in relation to FIGS. 1 and 2.

At block 402, an initial summary is generated from an original document. The initial summary is a selection of extracted sentences copied from the whole document. Blocks 404-410 may be iteratively repeated for each extracted sentence of the initial summary, starting with the first extracted sentence.

At block 404, the extracted sentence is processed to generate a corresponding abstracted sentence. The abstracted sentence is a paraphrasing of the extracted sentence and may include less text and less information compared to the extracted sentence. The abstracted sentence may be generated by an encoder-aligner-decoder, or other suitable techniques.

At block 406, vector representations are computed for the extracted sentence, abstracted sentence, the whole document, and the current summary as it exists after the previous iteration of the process. The generation of the whole document representation and summary representation are discussed further above in relation to FIGS. 1 and 2.

At block 408, the vector representations from block 406 are input to a decision network such as the ANN 106 of FIGS. 1 and 2. The output of the decision network is an editing decision that determines whether the extracted sentence is added to the summary or the abstracted sentence is added to the summary instead of the extracted sentence. In some embodiments, the decision network may also be configured to generate an editing decision to discard the extracted sentence.

At block 410, the summary is updated based on the editing decision. In accordance with the editing decision, the summary may be updated by adding the extracted sentence, adding the abstracted sentence, or adding neither sentence and maintaining the summary in its current form if the editing decision is to discard the sentence.

The process flow diagram of FIG. 4 is not intended to indicate that the operations of the method 400 are to be executed in any particular order, or that all of the operations of the method 400 are to be included in every case. Additionally, the method 400 can include additional operations. Addition variations on the above method 400 may be made within the scope of the described subject matter.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
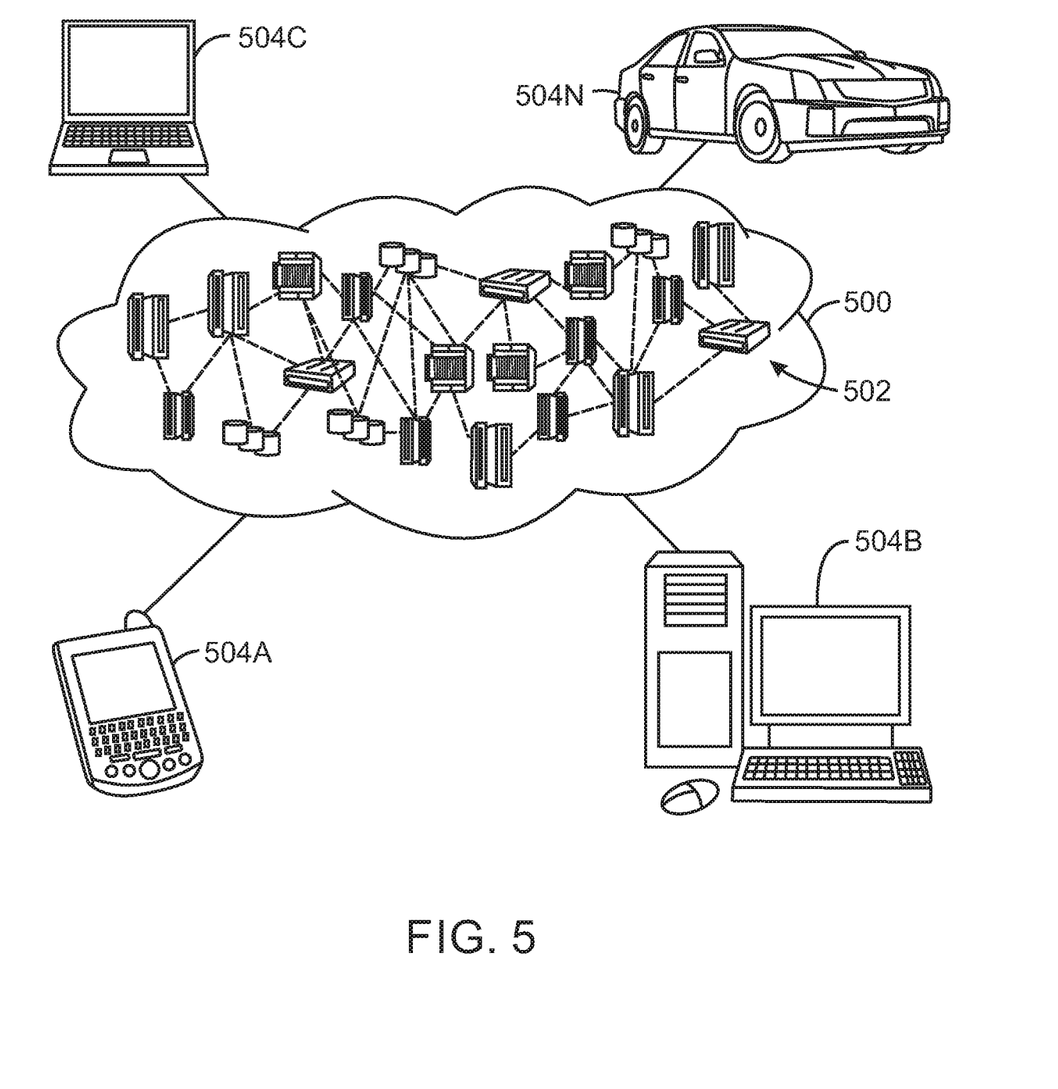
FIG. 5 depicts an illustrative cloud computing environment according to an embodiment described herein.

Referring now to FIG. 5, illustrative cloud computing environment 500 is depicted. As shown, cloud computing environment 500 comprises one or more cloud computing nodes 502 with which local computing devices used by cloud consumers, such as, for example, personal digital assistant (PDA) or cellular telephone 504A, desktop computer 504B, laptop computer 504C, and/or automobile computer system 504N may communicate. Nodes 502 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 504A-N shown in FIG. 5 are intended to be illustrative only and that computing nodes 502 and cloud computing environment 500 can communicate with any type of computerized device over any type of network and/or network addressable connection (e.g., using a web browser).

Figure 6:
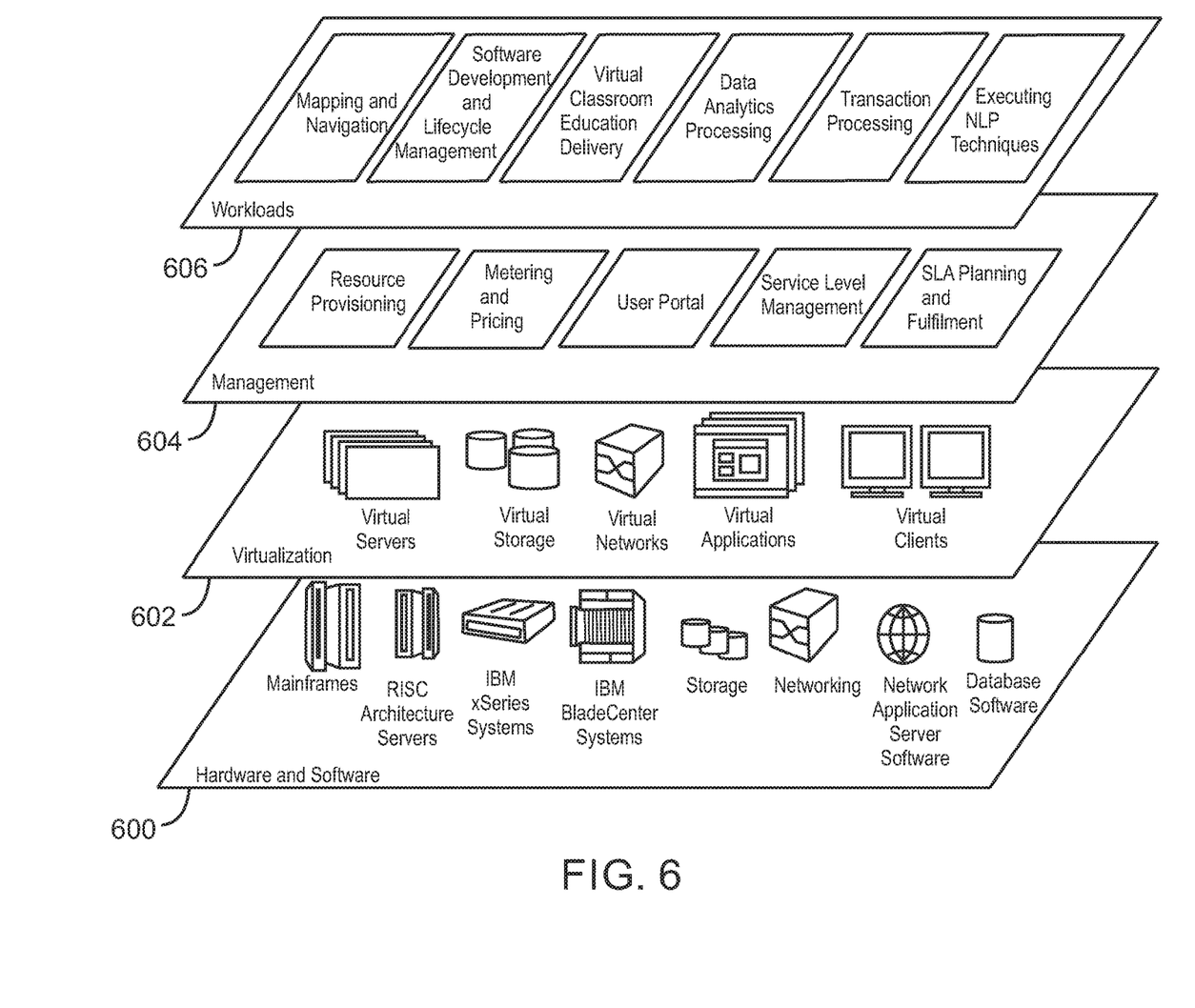
FIG. 6 depicts a set of functional abstraction layers provided by a cloud computing environment according to an embodiment described herein.

Referring now to FIG. 6, a set of functional abstraction layers provided by cloud computing environment 600 (FIG. 6) is shown. It should be understood in advance that the components, layers, and functions shown in FIG. 6 are intended to be illustrative only and embodiments of the invention are not limited thereto. As depicted, the following layers and corresponding functions are provided.

Hardware and software layer 600 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 602 provides an abstraction layer from which the following examples of virtual entities may be provided: virtual servers; virtual storage; virtual networks, including virtual private networks; virtual applications and operating systems; and virtual clients. In one example, management layer 604 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 606 provides examples of functionality for which the cloud computing environment may be utilized. Examples of workloads and functions which may be provided from this layer include: mapping and navigation; software development and lifecycle management; virtual classroom education delivery; data analytics processing; transaction processing; and natural language processing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for generating a summary of a text document, the system comprising:
a processor to:
generate an initial summary of an original document, the initial summary comprising a selection of extracted sentences copied from the original document; and
for each extracted sentence of the initial summary:
process the extracted sentence to generate an abstracted sentence;
generate vector representations of the extracted sentence, the abstracted sentence, the original document, and the current summary;
input the vector representations to a decision network to compute an editing decision, wherein the editing decision is selected from a group of possible decisions comprising a decision to add the extracted sentence and a decision to add the abstracted sentence, and wherein the decision network is trained according to a cross-entropy loss function, wherein the cross-entropy loss function is computed based on a soft label computed for each editing decision of a predicted summary; and
update the current summary based on the editing decision.

2. The system of claim 1, wherein the group of possible decisions comprises a decision to discard the extracted sentence and the abstracted sentence.

3. The system of claim 1, wherein the soft label is computed by computing quality scores for each editing decision, wherein the soft label is the average of all alternative quality scores included by the editing decision divided by a normalization factor.

4. The system of claim 1, wherein to generate the abstracted sentence, the processor is to apply an encoder-decoder to three consecutive extracted sentences of the initial summary.

5. The system of claim 4, wherein to generate the abstracted sentence, the processor is to bias the word attention applied by the encoder-decoder according to a selection likelihood calculated for each extracted sentence during the selection of extracted sentences for the initial summary.

6. The system of claim 1, wherein to generate the vector representation of the abstracted sentence, the processor is to insert the abstracted sentence into the original document and then encode the abstracted sentence into the vector representation.

7. The system of claim 1, wherein the processor is to update the vector representation of the current summary based on the editing decision.

8. The system of claim 1, wherein to generate the initial summary of the original document, the processor is to calculate a selection likelihood for each sentence of the original document using a pointer network.

9. A method of generating a summary of a text document, the method comprising:
- generating an initial summary of an original document, the initial summary comprising a selection of extracted sentences copied from the original document; and
- for each extracted sentence of the initial summary:
- processing the extracted sentence to generate an abstracted sentence;
- generating vector representations of the extracted sentence, the abstracted sentence, the original document, and the current summary;
- inputting the vector representations to a decision network to compute an editing decision, wherein the editing decision is selected from a group of possible decisions comprising a decision to add the extracted sentence and a decision to add the abstracted sentence; and
- updating the current summary based on the editing decision and updating the vector representation of the current summary based on the editing decision.

10. The method of claim 9, wherein the group of possible decisions comprises a decision to discard the extracted sentence and the abstracted sentence.

11. The method of claim 9, wherein the decision network is trained according to a cross-entropy loss function, wherein the cross-entropy loss function is computed based on a soft label computed for each editing decision of a predicted summary.

12. The method of claim 11, wherein the soft label is computed by computing quality scores for each editing decision, wherein the soft label is the average of all alternative quality scores included by the editing decision divided by a normalization factor.

13. The method of claim 9, wherein generating the abstracted sentence comprises applying an encoder-decoder to three consecutive extracted sentences of the initial summary.

14. The method of claim 13, wherein generating the abstracted sentence further comprises biasing the word attention applied by the encoder-decoder according to a selection likelihood calculated for each extracted sentence during the selection of extracted sentences for the initial summary.

15. The method of claim 9, wherein generating the vector representation of the abstracted sentence comprises inserting the abstracted sentence into the original document and then encoding the abstracted sentence into the vector representation.

16. The method of claim 9, wherein generating the initial summary of the original document comprises calculating a selection likelihood for each sentence of the original document using a pointer network.

17. A computer program product for generating a summary of a text document comprising a computer readable storage medium having program instructions embodied therewith, wherein the computer readable storage medium is not a transitory signal per se, and wherein the program instructions are executable by a processor to cause the processor to:
- generate an initial summary of an original document, the initial summary comprising a selection of extracted sentences copied from the original document; and
- for each extracted sentence of the initial summary:
- process the extracted sentence to generate an abstracted sentence;
- generate vector representations of the extracted sentence, the abstracted sentence, the original document, and the current summary;
- input the vector representations to a decision network to compute an editing decision, wherein the editing decision is selected from a group of possible decisions comprising a decision to add the extracted sentence and a decision to add the abstracted sentence, wherein the decision network is trained according to a cross-entropy loss function computed based on a soft label computed for each editing decision of a predicted summary, wherein the soft label is computed by computing quality scores for each editing decision, and wherein the soft label is the average of all alternative quality scores included by the editing decision divided by a normalization factor; and
- update the current summary based on the editing decision.

18. The computer program product of claim 17, wherein generating the abstracted sentence comprises applying an encoder-decoder to three consecutive extracted sentences of the initial summary.

19. The computer program product of claim 17, wherein generating the abstracted sentence further comprises biasing the word attention applied by the encoder-decoder according to a selection likelihood calculated for each extracted sentence during the selection of extracted sentences for the initial summary.

20. The computer program product of claim 17, wherein generating the vector representation of the abstracted sentence comprises inserting the abstracted sentence into the original document and then encoding the abstracted sentence into the vector representation.

* * * * *